Patented Aug. 23, 1932

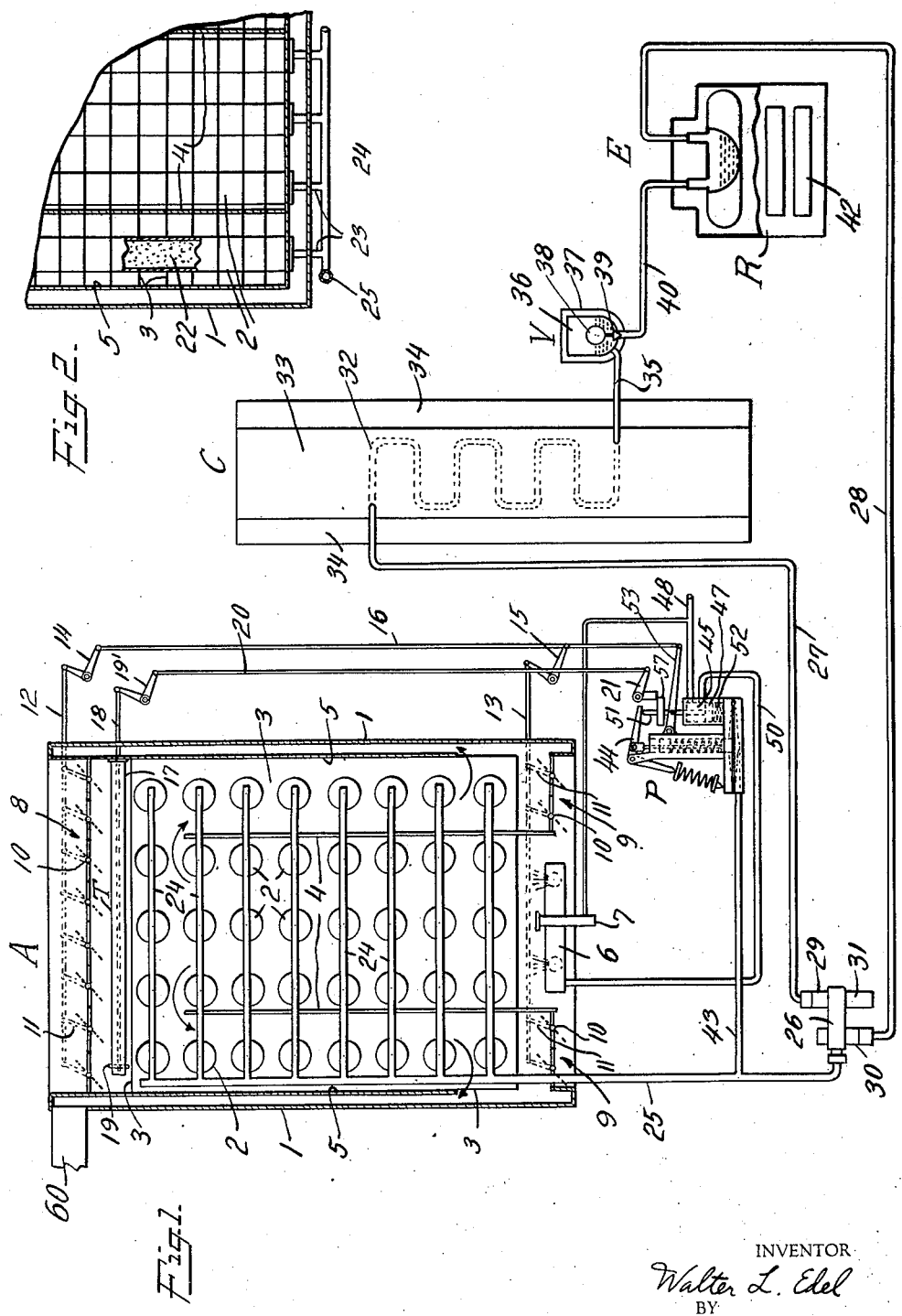

1,873,319

UNITED STATES PATENT OFFICE

WALTER L. EDEL, OF NEW HAVEN, CONNECTICUT, ASSIGNOR, BY MESNE ASSIGNMENTS, TO FRIGIDAIRE CORPORATION, A CORPORATION OF DELAWARE

REFRIGERATING SYSTEM

Application filed August 4, 1927. Serial No. 210,520.

This invention relates to refrigerating systems, and more particularly concerns a simplified refrigerating system of the absorption type.

In one design of refrigerating system operating on the absorption principle, a combined absorber and generator is provided comprising a container filled with a suitable substance having the property of absorption or occlusion, and means are provided in connection with the container to alternately supply heat to and cool this substance. The absorbent material is charged with a suitable liquefiable refrigerant such as ammonia gas, and this gas is expelled from the container at a high pressure when heat is supplied to the absorbent material therein. The gaseous refrigerant expelled from the container is cooled and liquefied in a suitable condenser and is supplied in liquid form to a refrigerating unit or evaporator. When a predetermined amount of refrigerant has been expelled from the container, automatic apparatus operates to cut off the heat from the absorber generator, and to supply a cooling medium thereto whereupon the absorbent substance is cooled and tends to absorb the gaseous refrigerant, thus reducing the pressure within the absorber generator. An outlet or return duct or pipe is provided between the evaporator and the absorber generator container, and when the pressure in the container is reduced, the pressure in the evaporator is also reduced through this pipe to a point at which the liquid refrigerant in the evaporator gasifies, thus producing the desired refrigerating or heat absorbing effect. The gaseous refrigerant from the evaporator returns through the outlet or return duct to the absorber generator container where it is absorbed by the absorbent substance therein, and after a predetermined amount of liquid refrigerant has thus been gasified, the cooling medium is cut off from the absorber generator and heat is again applied thereto, thus repeating the cycle of operation of the system.

In the type of refrigerating system described, it is necessary to supply both a heating medium and a cooling medium to the apparatus, and to control the supply of these mediums in accordance with the operation of the system. A gas burner is usually employed as a heating means, and water is ordinarily used for cooling, the control of the burner and of the cooling water being effected by electrically operated control mechanism. Thus where an installation of a refrigerating system of this type is to be made, there must be available not only a supply of illuminating gas, but a supply of running water and electricity as well.

With the above and other considerations in mind, it is proposed in accordance with the present invention to provide a simplified refrigerating system of the absorption type which requires the supply of a heating medium only for its operation, and, more specifically, it is proposed to provide a system of the type described in which air from the surrounding atmosphere is employed as a cooling medium and in which the control of the heating means and the cooling air is effected by means responsive to pressure and temperature conditions in the system.

It is a further object of the present invention to provide improved controlling means for use in connection with an absorption refrigerating system, which means are operated directly by pressure and temperature responsive devices.

Other objects, details and characteristic features of the invention will become apparent as the description thereof progresses.

In describing the invention in detail, reference will be made to the accompanying drawing, in which:

Figure 1 is a simplified and diagrammatic view of an absorption refrigerating system incorporating one embodiment of the present invention; and Fig. 2 is a sectional view of a portion of the absorber generator employed in the system shown in Fig. 1.

As shown in Fig. 1 of the drawing, the refrigerating system of the present invention comprises in general an absorber generator A, a refrigerant condenser C, a liquid float valve V, an evaporator E and a control device P. The absorber generator of the system may comprise separate units if desired, but in the embodiment shown, these devices are combined in a single unit. The absorber generator unit comprises a housing or compartment 1 which is open at the top and bottom, and in which are mounted a plurality of laterally extending tubes or drums 2. The drums 2 may be mounted in any suitable manner, and as shown, each drum is secured in aligned openings in a plurality of parallel vertical fins or partitions 3, these fins being suitably secured to the inner walls 5 of the housing 1. A plurality of vertical parallel baffle plates 4, lying at right angles to the fins 3, are mounted within the housing 1 as shown, the lower ends of these baffles extending substantially to the lower open end of the housing. The inner walls 5 of the housing are spaced a short distance from the outer walls thereof, and extend to a point above the lower ends of the baffle plates 4 as shown, and an outlet opening 60 is provided in the outer walls to permit the escape of the heating gases from the space between the inner and outer walls.

Suitable heating means are provided within the housing 1 and in the embodiment shown, this means comprises a plurality of gas burners 6 of any suitable type having a pilot burner 7 in connection therewith for lighting the burners 6 when gas is supplied thereto. The burners 6 are located at the lower end of the housing 1 between the baffle plates 4. Two sets of dampers 8 and 9 are mounted at the upper and lower ends of the housing respectively, being journalled in the inner walls 5 thereof. The dampers may take any suitable form and as shown comprise rectangular plates having pins or hubs 10 at their ends to which are fixed levers 11 set at an angle to the plates as shown. All of the levers 11 of each set of dampers 8 and 9 are pivotally connected respectively to operating rods or bars 12 and 13 which bars are connected through the bell crank levers 14 and 15 to a vertical operating bar 16, the operation of which is controlled as hereinafter described. With this arrangement, all of the dampers in the sets 8 and 9 are closed by a downward movement of the bar 16, and are opened by an upward movement of this bar. The dampers of the lower set 9 are arranged to close the space between the baffle plates 4 and the inner walls 5 of the housing 1, while the upper dampers 8 close the entire upper opening of the housing between the inner walls 5.

A thermostat or temperature operated device T is mounted within the housing 1 between the upper dampers 8 and the upper ends of the fins 3 as shown. This thermostat may be of any conventional type, and as shown, comprises a horizontal tube 17 fixed to the inner wall 5 of the housing 1 and enclosing a rod 18 which passes through in the housing walls, the rod 18 and the tube 17 being connected at their inner ends by a pin 19. The rod 18 and the tube 17 are formed of metals having different coefficients of heat expansion, the tube expanding more rapidly than the rod for a given increase in temperature, so that the rod 18 is moved to the left as shown in Fig. 1 as the temperature within the housing 1 increases. The rod 18 is connected through a pivoted bell crank lever 19' to a vertical operating bar 20, the lower end of which is connected to a second bell crank lever 21.

The drums 2 of the absorber generator A are filled with a suitable substance having the property of absorbing relatively large quantities of the refrigerant employed when this refrigerant is in the gaseous state. The refrigerant employed is preferably anhydrous ammonia although other suitable refrigerants may be used, and the absorbent substance may comprise calcium chloride, charcoal, diatomaceous earth, silica "gel" or any other suitable substance having the property of effecting the absorption or occlusion of the refrigerant used. The absorbent substance is preferably in dry powdered or lump form, and has been represented at 22 in the drum 2. Each of the drums 2 is connected by a suitable pipe 23 with a header pipe 24, which in turn is connected to a vertical manifold pipe 25 passing out through the lower end of the housing 1.

From the above description of the generator absorber A it will be evident that when the sets of dampers 8 and 9 are closed and the burners 6 are lighted, hot gases circulate around the drums 2, passing upward between the baffle plates 4, downward between these baffles and the inner walls of the housing and upward between the walls 5 and the outer housing walls to the outlet opening 60 as generally indicated by the arrows. When the dampers 8 and 9 are open and the burners 6 are shut off, air from the surrounding atmosphere circulates freely through the housing and rapidly cools the drums 2, the fins 3 acting to conduct heat from the drums to the circulating air.

The particular form of generator absorber described above is not essential to the proper operation of the refrigerating system of the present invention, but has been chosen as illustrating one form of apparatus which may be employed for this purpose.

The manifold pipe 25 is connected with a manifold 26 which is connected with two other pipes 27 and 28 through two check valves 29 and 30 respectively. The check valves 29 and 30 may be of any well known or suitable construction, the valve 29 being arranged to permit fluid to flow from the manifold 26 to the pipe 27 only and the valve 30 being designed to permit fluid to flow from the pipe 28 to the manifold 26 only. A plug or fitting 31 may be provided in the manifold 26 to permit the introduction and withdrawal of the refrigerant. The pipe 27 is connected to the coil 32 of the condenser C. The coil 32 is enclosed within a cooling tank 33 which is preferably filled with a heat absorbing substance such as water, suitable fins 34 being provided on this tank whereby heat may be readily radiated and conducted therefrom to the surrounding atmosphere.

The lower or outlet end of the condenser coil 32 is connected by a pipe 35 to the float valve unit V. The unit V comprising a closed collecting chamber 36, preferably surrounded by a heat insulated wall 37 and containing a float 38 carrying an outlet valve 39, the float and valve being arranged to permit a small quantity of liquefied refrigerant to flow from the chamber 36 to the outlet pipe 40 when the liquid level in the chamber rises above a predetermined point. The pipe 40 is connected to an evaporator E located in a refrigeration unit R. The evaporator may take any suitable form, and preferably comprises a container formed with a plurality of passages or otherwise arranged to present a comparatively large surface area for absorbing heat from the refrigeration unit. The pipe 28 connected with the manifold 26 through the check valve 30 is connected to the evaporator E and forms an outlet for conducting the gasified refrigerant away from the evaporator. The refrigeration unit R may take any suitable form, and may include a tank surrounding the evaporator E and filled with a suitable fluid having a low freezing point such as brine. Freezing compartments 42 may be provided in the refrigeration unit R if desired. The refrigeration unit R absorbs heat from the surrounding atmosphere and thereby maintains the desired low temperature in the refrigerator or other refrigerated space in which this unit is located.

Referring now to the control apparatus of the present invention, a pressure operated device P is connected by a pipe 43 to the manifold pipe 25 of the generator absorber A. The device P is preferably of the type described in my copending application, Serial No. 192,775, filed May 19, 1927. This device includes an arm 44 which is raised with a snap action by a suitable diaphragm when the pressure in the pipe 43 increases above a predetermined point, and is moved to a lower position by a spring when the pressure in the pipe 43 has fallen a predetermined amount below the pressure required to raise the arm, suitable means being provided to adjustably vary the device to respond to different pressures. A gas control valve 45 is provided in connection with the device P. This valve may be of any suitable type, and has been diagrammatically represented as a plunger valve having a gate 47 which cuts off communication between the gas supply pipe 48 and the burner supply pipe 50 when the valve stem or rod 51 is in its upper position. The upper end of the valve rod 51 is aligned with the outer end of the arm 44 on the device P, the arrangement being such that the downward movement of the arm depresses the valve rod and opens the valve, whereas the upward movement of the arm does not move the rod. A coiled spring 52 is provided to bias the valve gate 47 and the rod 51 toward the upward position to close the valve. A lever 53 is pivotally connected to the device P and to the rod 51, and serves to transmit motion from the rod to the damper operating bar 16. A stop 57 is fixed to the valve rod 51 at such a point thereon that when the rod 51 is depressed to its lower position by the arm 44, the lower arm of the bell crank lever 21 may engage the upper surface of this stop and maintain the rod 51 in its lower position, even though the rod is released by the arm 44.

The operation of the refrigerating system described may be generally divided into two cycles which will be designated as the distillation or generation cycle and the absorption cycle. The distillation cycle begins when nearly all of the liquid refrigerant in the evaporator E has gasified and has been absorbed by the absorbent substance 22 in the drums 2 of the absorber generator A. At this point the pressure in the manifold pipe 25, and therefore in the pipe 43 connected thereto, is reduced to a value at which the device P is operated by its spring to move the arm 44 to its lower position as shown in the drawing. The arm 44 depresses the rod 51 and thus opens the gas valve 45, permitting gas to flow from the supply pipe 48 through the pipe 50 to the burners 6. The burners are lighted by the pilot light 7 and heat is thereby applied to the absorber generator A. As the gas valve 45 is opened, the downward movement of the rod 51 pulls down the damper operating bar 16 and closes the sets of dampers 8 and 9 through the bell crank levers 14 and 15, the bars 12 and 13 and the levers 11. With the dampers shut, the housing 1 is closed and the hot gases from the burners 6 pass up between the fins 3, over the baffles 4, downward between these baffles and the inner walls 5 and finally upward between the inner walls 5 and the outer walls of the housing 1 and out through the opening 60. At the time that the rod 51 is depressed the air within the absorber generator is comparatively cool, the dampers 8 and 9 having been opened and the burners 6 having been turned off just prior to the operation of this rod. For this reason, the thermostat T is cooled and the rod 18 thereof is moved to the right, thus shifting the bar 20 to its lower position. The lower arm of the bell crank lever 21 is thereby moved to the left into engagement with the stop 57 on the valve rod 51, and when this rod is depressed by the arm 44 as described above, the lower arm of the lever 21 snaps over the top of the stop 57 and retains the valve rod 51 in its depressed position independently of the lever 44. If necessary, the members connecting the thermostat T to the lever 21 may be made resilient to permit the rod 18 to move to the right while the lever 21 engages the side of the stop 57. With the valve rod 51 thus held in the lower position, the dampers 8 and 9 are maintained closed and the gas valve 45 is held open until the rod 18 of the thermostat T has moved to the left far enough to cause the bell crank lever 21 to release the stop 57.

Soon after the dampers 8 and 9 are closed and the burners 6 are lighted, the increase in temperature of the drums 2 causes the expansion of the ammonia gas contained in the absorbent material 22 within these drums, and the pressure in the manifold pipe 25 and in the pipe 43 rises to a point at which the device P is operated to raise the arm 44 to its upper position, the rod 51 and its associated mechanism remaining in the lower position as explained above. The pressure in the manifold pipe 25 also opens the check valve 29 in the manifold 26 and the gaseous refrigerant passes through the pipe 27 to the coil 32 of the condenser C, where it is cooled and liquefied by the cooling water in the condenser tank 33. The refrigerant collects in the collecting chamber 36 of the liquid float valve V, and when the liquid level in this chamber rises above a predetermined point, the float 38 opens the outlet valve 39 to permit a small quantity of the liquid refrigerant to pass into the evaporator container E through the pipe 40. This operation of the outlet valve 39 continues intermittently until a suitable quantity of the liquid refrigerant has collected in the evaporator E.

The generator absorber operates in such a manner that the heat from the burners 6 is absorbed by the absorbent material in the drums 2 in decreasing quantities as successive quantities of the gaseous refrigerant are distilled or expelled from the absorbent material. As the amount of heat from the burners absorbed by the absorbent material thus decreases, the temperature of the thermostat T increases, and the thermostat and its associated control mechanism are so arranged that at the temperature reached by the thermostat when a predetermined quantity of refrigerant has been distilled, the rod 18 is moved far enough to the left to move the bell crank lever 21 out of engagement with the stop 57 on the valve rod 51, whereupon the spring 52 lifts the rod 51 together with the associated gas valve and shutter operating mechanism to the upper position. In this manner, the gas supplied to the burners 6 is cut off by the valve 45 and the shutters 8 and 9 are open, thus ending the distillation cycle.

When the shutters 8 and 9 are open, the heat of the various parts within the generator absorber housing 1 causes air to pass through this housing thus absorbing the heat from the drums 2. The cooling air passes directly through the container, and the fins 3 assist in transmitting the heat from the drums 2 to the air. In this manner, the absorbent material 22 in the drums 2 is cooled and this material thereby resumes its affinity for the gaseous refrigerant, and at this point the absorption cycle begins. The absorption of the gaseous refrigerant by the absorbent material in the drums 2 reduces the pressure in the manifold pipe 25 to a point below the pressure in the pipe 28, whereupon the check valve 30 opens, permitting gaseous refrigerant to pass from the evaporator E through the pipe 28, the valve 30, the manifold 26, pipes 25, 24 and 23, to the drums 2. The vapor pressure in the evaporator E is thereby reduced, and the liquid refrigerant in the evaporator gasifies thus producing the desired refrigerating or heat absorbing effect. As the gaseous refrigerant is absorbed in the absorber generator A, the pressure in the evaporator E, and therefore in the pipes 28, 25 and 43, is reduced, and after a predetermined amount of liquid refrigerant has been evaporated, this pressure is reduced to a point at which the device P is operated by its spring to lower the arm 44, thus lighting the burners 6, closing the dampers 8 and 9 and again initiating a distillation cycle as described above.

From the description given, it will be apparent that the present invention provides an extremely compact and efficient refrigerating system. The control means operate automatically and require no electricity or other external source of power. The entire system requires but one fuel supply connection for its operation, and therefore is easily installed, and is particularly adaptable for use in suburban or rural districts where public service facilities are limited.

Although the present invention has been described in connection with a single specific refrigerating system, embodying certain specific devices and units, it should be clearly understood that various changes, modifications, additions or omissions may be made to the system without departing from the invention as defined by the appended claims.

I claim:

1. In a refrigerating system of the absorption type, an absorber generator including a housing, a container for absorption material, means for supplying heat to said absorber generator, means for supplying a cooling medium to said absorber generator, and means operated in accordance with the fluid pressure in said container and the temperature of said housing for controlling the operation of said heat supply means and said cooling medium supply means.

2. In a refrigerating system of the type in which a liquefied refrigerant is permitted to gasify in an evaporator, an absorber including a housing, a container within said housing and connected to said evaporator and containing a substance for absorbing the gaseous refrigerant from said evaporator, means controlled by the temperature of said housing for supplying a cooling medium to said absorber, and means controlled by the pressure in said container for cutting off the supply of said cooling medium.

3. In a refrigerating system of the type in which a liquefied refrigerant is permitted to gasify in an evaporator, an absorber including a housing, a container within said housing and connected to said evaporator and containing a substance for absorbing the gaseous refrigerant from said evaporator, controllable means for supplying heat to said container, means controlled by the temperature of said housing for cutting off said heat supply and for supplying a cooling medium to said container, and means controlled by the pressure in said container for turning on said heat supply means and for cutting off the supply of said cooling medium to said container.

4. In a refrigerating system of the type in which a liquefied refrigerant is permitted to gasify in an evaporator, an absorber including a housing, a container connected to said evaporator and containing a substance for absorbing the gaseous refrigerant from said evaporator, a heater for said container, means operated by a minimum pressure in said container for turning on said heater to supply heat to said container, and means operated by a maximum temperature of said housing for turning off said heater.

5. In a refrigerating system of the type in which a liquefied refrigerant is permitted to gasify in an evaporator, an absorber including a housing, a container within said housing and connected to said evaporator and containing a substance for absorbing the gaseous refrigerant from said evaporator, means for controlling the supply of a cooling medium to said container, means operated by a maximum temperature of said housing to open said control means to supply said cooling medium to said container, and means operated by a minimum pressure in said container to close said cooling medium control means.

6. In a refrigerating system of the type in which a liquefied refrigerant is permitted to gasify in an evaporator, an absorber including a housing, a container within said housing and connected to said evaporator and containing a substance for absorbing the gaseous refrigerant from said evaporator, a heater for said container, means for controlling the supply of a cooling medium to said container, means operated by a minimum pressure in said container to close said cooling medium control means and to turn on said heater to supply heat to said container and means operated by a maximum temperature of said housing to turn off said heater and to open said cooling medium control means, whereby said container is cooled after it has been heated to a maximum temperature and is heated after the pressure therein is reduced to minimum value.

7. In a refrigerating system of the type in which a liquefied refrigerant is permitted to gasify in an evaporator, an absorber comprising a container enclosed in a housing and connected to said evaporator, said container containing a substance for absorbing the gaseous refrigerant from said evaporator, a burner for supplying heat to said container, and a control device operated by the temperature in said housing and by the pressure in said container for controlling the supply of fuel to said burner.

8. In a refrigerating system of the type in which a liquefied refrigerant is permitted to gasify in an evaporator, an absorber comprising a container enclosed in a housing and connected to said evaporator, said container containing a substance for absorbing the gaseous refrigerant from said evaporator, a burner for supplying heat to said container, means operated in accordance with the pressure in said container for supplying fuel to said burner, and means operated in accordance with the temperature in said housing for cutting off the supply of fuel from said burner.

9. In a refrigerating system of the type in which a liquefied refrigerant is permitted to gasify in an evaporator, an absorber comprising a container enclosed in a housing and connected to said evaporator, said container containing a substance for absorbing the gaseous refrigerant from said evaporator, a burner for supplying heat to said container, means for permitting the passage of air through said housing for cooling said container, and a control device operated in accordance with the pressure in said container to cut off the passage of air through said housing and to supply fuel to said burner, and operated in accordance with the temperature in said housing to cut off the supply of fuel to said burner, and to permit the passage of cooling air through said housing.

10. Refrigerating apparatus comprising a generator including a container, a conduit for fluid in heat exchange relation to said container, means for heating the fluid within said conduit and means for controlling said heating means responsive to the condition of said fluid after passing in heat exchanging relation to said container.

11. Refrigerating apparatus comprising a generator including a container, a conduit for products of combustion in heat exchange relation to said container, a burner in operative relation to said conduit, means for supplying fuel to said burner, and means responsive to the temperature of the products of combustion after passing in heat exchange relation to said container, said last named means controlling the fuel supply means.

12. Refrigerating apparatus comprising a generator including a container, a conduit in heat exchange relation to said container, a burner within said conduit at one end thereof, means for supplying fuel to said burner, a thermostat within said conduit beyond said container for controlling said fuel supply means, said thermostat being so located within the conduit as to be responsive to the temperature of the products of combustion after passing in heat exchange relation to said container.

13. A refrigerating method which consists in passing heated products of combustion in heat exchange relation to obsorption material, liberating refrigerant gas by such heat, condensing the liberated refrigerant, evaporating the condensed refrigerant and controlling the supply of the heated products of combustion by the temperature thereof after heat exchange with the obsorption material.

14. Refrigerating apparatus comprising a generator-absorber including a container for absorption material and a plurality of passages for fluid, means for heating said generator-absorber through said passages and means automatically operative upon the termination of the heating means for connecting the passages in parallel and upon the initiation of the heating period for connecting the passages in series.

15. Refrigerating apparatus comprising a generator-absorber adapted to be alternatively and intermittently heated and cooled and including a container for absorption material, a conduit in heat exchange relation to said container adapted to conduct a heating fluid during the heating period and a cooling fluid during the cooling period and means automatically operative on the termination of the heating period to vary the effective length of said conduit.

16. Refrigerating apparatus comprising a generator absorber adapted to be alternatively and intermittently heated and cooled and including a container for absorption material, a conduit in heat exchange relation to said container adapted to conduct a heating fluid during the heating period and a cooling fluid during the cooling period and means automatically operative on the termination of the cooling period to vary the effective length of said conduit.

17. Refrigerating apparatus comprising a generator-absorber including a housing open at both ends and composed of inner and outer walls forming a space therebetween, said space communicating with the interior of the housing through openings in the inner wall near the bottom thereof and with the atmosphere through an opening in the outer wall near the top thereof, one or more containers for absorption material within said housing, baffles within said housing and shutters arranged to close one end of said housing and cooperating with said baffles to pemit the flow of cooling fluid directly through the housing during the cooling period and to cause the flow of heating fluid through said space during the heating period.

18. A refrigerating system including a generator absorber adapted to be heated to supply gaseous refrigerant and adapted to be cooled to absorb gaseous refrigerant, means for circulating a fluid heating medium in heat exchange relation with the generator absorber, a fluid cooling medium in heat exchange relation with the generator absorber, and means responsive to a predetermined high temperature of the heating medium for stopping the circulation of the heating medium and starting circulation of the cooling medium.

19. A refrigerating system including a generator absorber adapted to be heated to supply gaseous refrigerant and to be cooled to absorb gaseous refrigerant, means responsive to the pressure of the refrigerant for circulating a fluid cooling medium in heat exchange relation with the generator absorber, and means responsive to the temperature of the heating medium for stopping the circulation of the heating medium and starting the cooling of the generator absorber.

20. A generator absorber for refrigerating apparatus comprising a plurality of spaced upright heat conducting plates having aligned openings therein, a plurality of containers charged with solid absorbent material disposed in said openings and thermally connected to the plates, and one or more upright baffles disposed between the plates and transverse thereto for dividing the space between the plates into passages.

21. A generator-absorber for refrigerating apparatus comprising a plurality of spaced upright heat conducting plates forming a plurality of passages, said plates having aligned openings therein, a plurality of containers charged with solid absorbent material disposed in said openings and thermally connected to the plates, means connecting the ends of the plates forming closure means for the spaces between the plates, and shutters disposed above and below the plates for connecting said passages either in series or in parallel.

In testimony whereof I affix my signature.

WALTER L. EDEL.